United States Patent [19]
Hasegawa et al.

[11] Patent Number: 5,652,701
[45] Date of Patent: Jul. 29, 1997

[54] INVERTER OPERATION COMMAND APPARATUS

[75] Inventors: Masayasu Hasegawa; Tomokazu Kimura; Hiroki Ichikawa; Kenshin Oohashi, all of Aichi, Japan

[73] Assignees: Mitsubishi Denki Kabushiki Kaisha; Mitsubishi Electric Engineering Co., Ltd., both of Tokyo, Japan

[21] Appl. No.: 413,638

[22] Filed: Mar. 30, 1995

[30] Foreign Application Priority Data

Mar. 30, 1994 [JP] Japan ................................. 6-060675

[51] Int. Cl.$^6$ ................................................. H02M 1/12
[52] U.S. Cl. ........................... 363/43; 363/132; 318/801
[58] Field of Search ................................ 318/801–803; 363/16, 27, 28, 40–43, 95–97, 120, 131–135

[56] References Cited

U.S. PATENT DOCUMENTS

| | | | |
|---|---|---|---|
| 5,442,537 | 8/1995 | Ooji | 363/43 |
| 5,444,344 | 8/1995 | Vincent | 318/599 |
| 5,497,065 | 3/1996 | Ito | 318/802 |

FOREIGN PATENT DOCUMENTS

| | | | |
|---|---|---|---|
| 0135015 | 3/1985 | European Pat. Off. | H02P 7/00 |
| 0256937 | 2/1988 | European Pat. Off. | H02P 7/00 |
| 0443585 | 8/1991 | European Pat. Off. | H02P 7/628 |
| 6426393 | 1/1989 | Japan | H02P 7/63 |
| 2178819 | 7/1990 | Japan | G06F 3/02 |
| 2171863 | 9/1986 | United Kingdom | H02P 7/42 |

OTHER PUBLICATIONS

Bedienungsanleitung zu Schnellader Fabrikat Graupner, Type mc–ultra duo plus II, pp. 1–8, Jul. 1994.

*Primary Examiner*—David S. Martin
*Attorney, Agent, or Firm*—Sughrue, Mion, Zinn, Macpeak & Seas

[57] ABSTRACT

An inverter operation command apparatus having increase and decrease keys which, when operated according to predetermined requirements, allows the frequency to be set quickly, requires only the increase/decrease key to be actuated to determine the rotation of direction and run/stop of the inverter, and allows the frequency display to be changed. Actuation of increase and decrease keys in predetermined orders, for predetermined durations and at predetermined times, in accordance with predetermined subroutines, will permit flexible control of the inverter frequency.

13 Claims, 10 Drawing Sheets

INVERTER OPERATION COMMAND APPARATUS

BACKGROUND OF THE INVENTION

1. Field of the Invention

The present invention relates to an operation command apparatus for use with a transistorized inverter which controls the frequency of a three-phase induction motor.

2. Description of Prior Art

Figure 10:
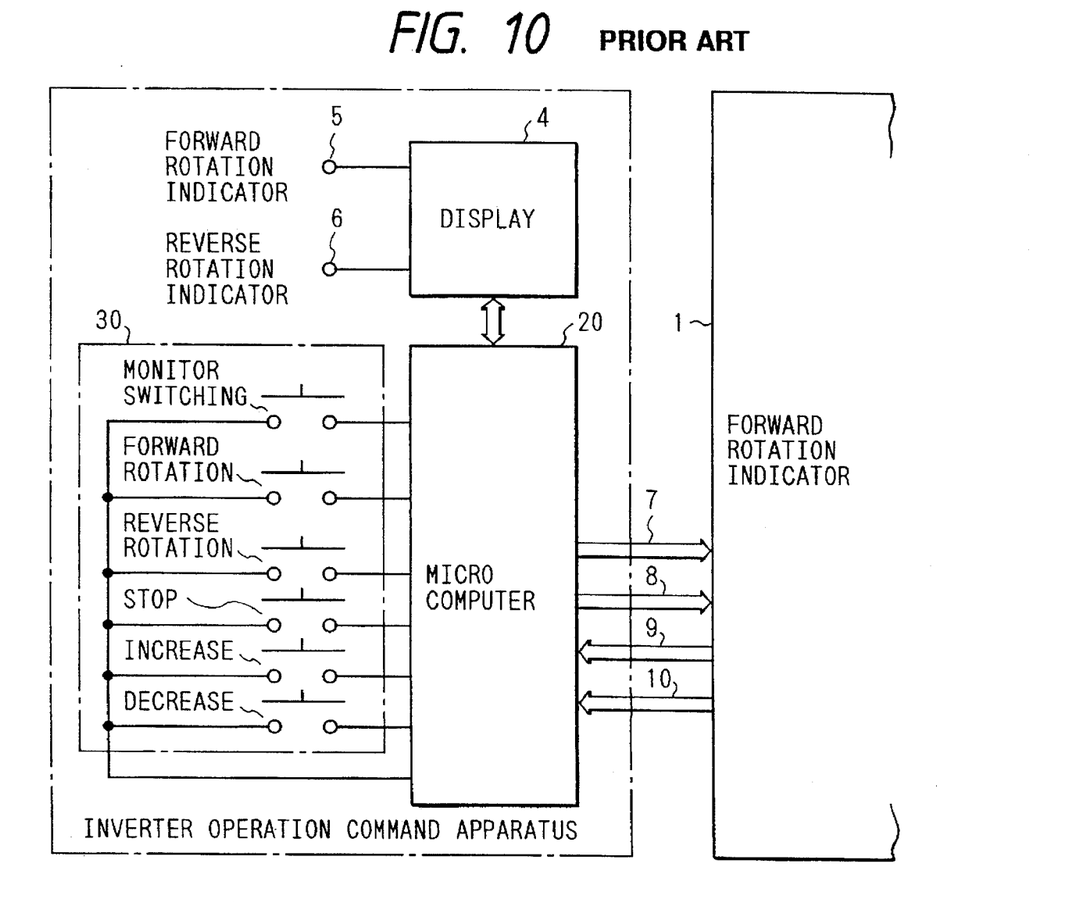
FIG. 10 is a schematic block diagram of a conventional inverter operation command apparatus.

FIG. 10 is a schematic block diagram of a conventional inverter operation command apparatus, wherein the numeral 1 indicates a transistorized inverter unit, 20 represents a controlling microprocessor, 30 designates operation keys consisting of a monitor switching key, a forward rotation key, a reverse rotation key, a stop key, an increase key, a decrease key, etc., 4 denotes a frequency display device, 7 indicates an operation command signal, 8 designates a frequency setting signal, 9 denotes an output frequency signal, and 10 represents a control power supply.

Operation will now be described. The signals of the various operation keys 30 are entered into the controlling microprocessor 20, which then generates the operation command signal 7 and the frequency setting signal 8 and enters them into the transistorized inverter unit 1. Further, the frequency display device 4 converts the frequency setting signal 8 and the output frequency signal 9 into numerical values and displays the results of conversion. Also, the frequency shown on the frequency display device 4 is switched between the frequency setting signal 8 and the output frequency signal 9 by pressing the monitor switching key among the operation keys 30. Also, the operation command signal 7 is output after a direction of rotation has been designated by operation of the forward rotation and reverse rotation keys 30. Furthermore, the direction of rotation is shown by indicators (forward rotation indicator 5, reverse rotation indicator 6).

Figure 11:
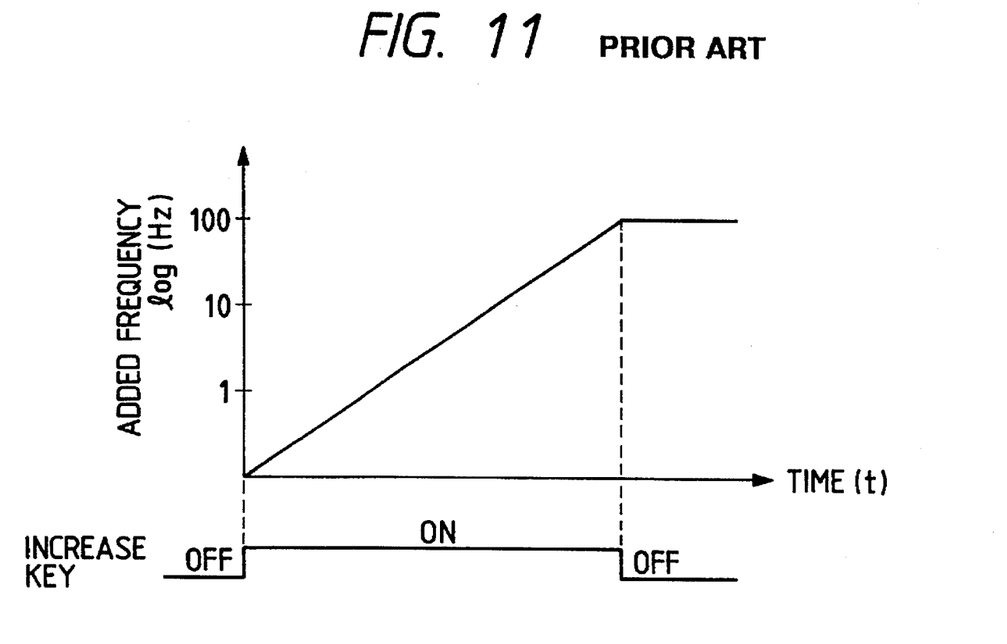
FIG. 11 is a diagram showing the change of a set frequency at the time of pressing the operation key in the conventional inverter operation command apparatus.

FIG. 11 shows the change of a set frequency at the time of pressing the operation key of the conventional inverter operation command apparatus, and the generation of the frequency setting signal 8 is described. While the increase key is being pressed, the frequency is increased. Specifically, 1 is continuously added to a current value of the frequency in order to reach a target value fast.

Figure 12:
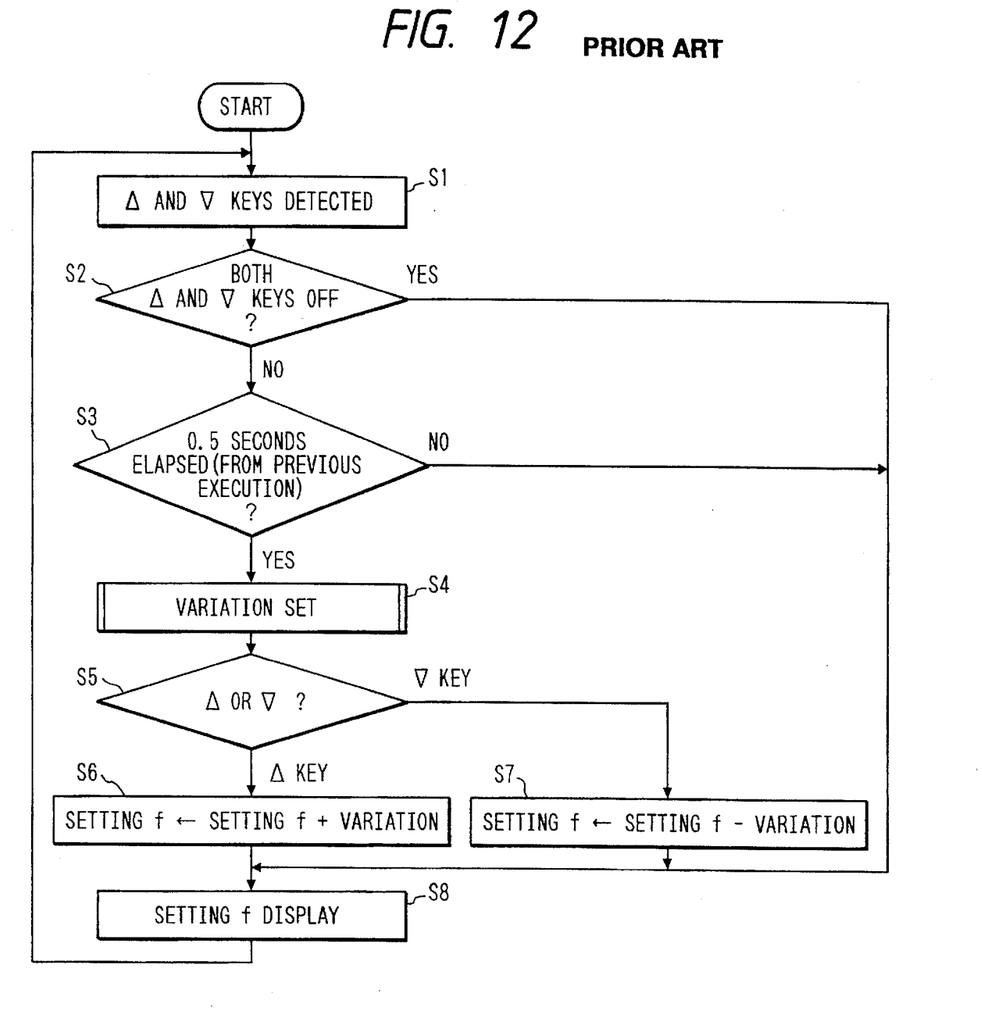
FIG. 12 is a flowchart showing processing at the time of pressing the operation key in the conventional inverter operation command apparatus.
Figure 13:
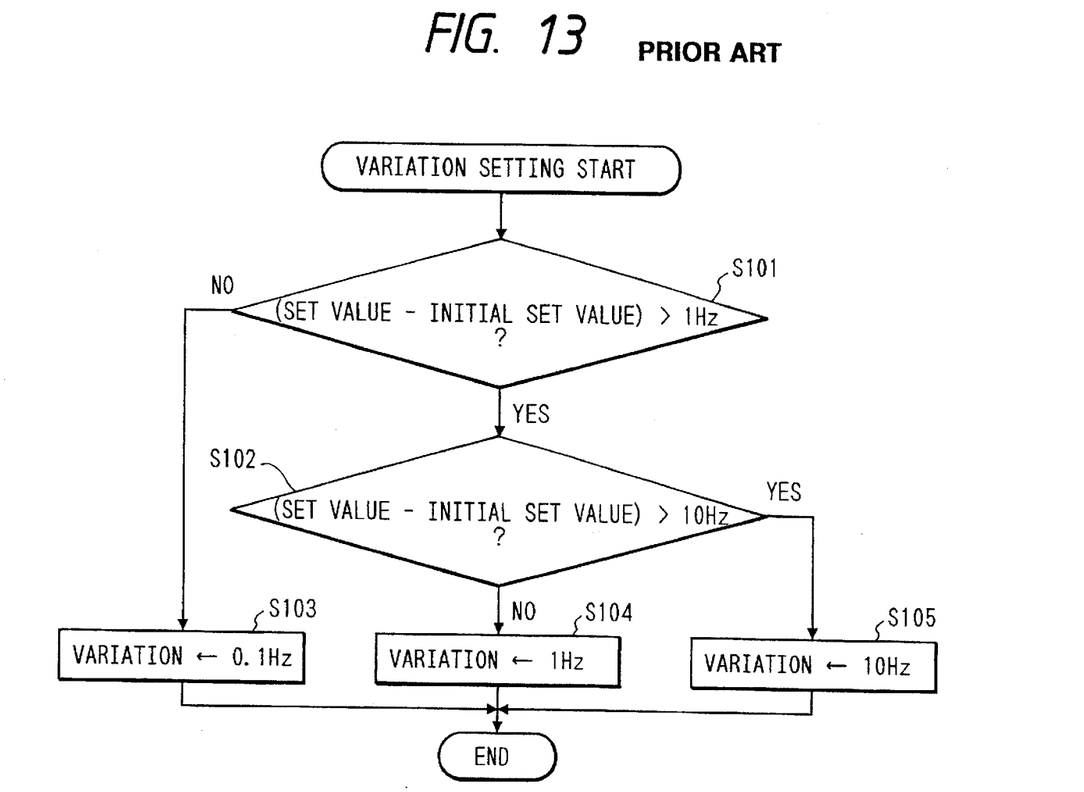
FIG. 13 is a flowchart showing processing at the time of pressing the operation key in the conventional inverter operation command apparatus.

FIGS. 12 and 13 are flowcharts for the conventional increase/decrease key. Processing performed when the increase/decrease key is pressed will now be described with reference to FIGS. 12 and 13. At step S1, the key pressed is detected (in the figure, the △/▽ key indicates the increase/decrease key). If the △ key and ▽ key are both off, the processing proceeds to step S8 (step S2). If either of the △ key or ▽ key has been pressed, it is determined whether 0.5 seconds have elapsed since the addition or subtraction processing of the frequency has been performed. If the time elapsed is less than 0.5 seconds, the operation moves to step S8. If 0.5 seconds have elapsed, the processing advances to step S4 (step S3).

Step S4 is a variation calculation subroutine, in which a variation value is set according to a difference between a current frequency set value and an initial set value before the △/▽ key is pressed.

Subsequently, it is determined whether the key pressed is the △ key or the ▽ key (step S5). If it is the △ key, the variation value is added to the frequency set value and the result of addition is defined as a new frequency set value (step S6). If the key pressed is the ▽ key, the variation value is subtracted from the frequency set value and the result of subtraction is defined as a new frequency set value (step S7).

The frequency set value calculated as described above is displayed (step S8) and the processing returns to the start step.

FIG. 13 is a flowchart for the variation calculation subroutine, with which the variation calculation subroutine at step S4 will be described. It is determined whether the difference between the current frequency set value and the initial set value before the △/▽ key is pressed is greater than 1 Hz (step S101). If it is less than or equal to 1 Hz, 0.1 Hz is set as the variation value (step S103). If it is not less than 1 Hz, it is further determined whether the difference is greater than 10 Hz (step S102). If it is less than or equal to 10 Hz, 1 Hz is set as the variation value (step S104). If it is greater than 10 Hz, 10 Hz is set as the variation value (step S105). The variation value is thus set and the processing ends.

When the conventional inverter operation command apparatus, designed as described above, was used to set the frequency, especially to set a much larger or smaller value, the change of the frequency was so fast that the target value was exceeded and the increase or decrease key had to be pressed several times, resulting in a long setting time. Also, at least the forward rotation/reverse rotation and even stop keys had to be pressed to determine the direction of rotation and to run/stop the inverter. Further, the dedicated key had to be pressed to change the frequency display.

SUMMARY OF THE INVENTION

It is accordingly an object of the present invention to solve the above problems by providing an inverter operation command apparatus and method which allows the frequency to be set quickly, requires only the increase/decrease key to be actuated to determine the rotation of direction and run/stop the inverter, and allows the frequency display to be changed.

According to the first embodiment, when the increase or decrease key is actuated to change the set frequency and the set frequency has approached the target frequency, the change of the frequency can be stopped at the target frequency easily by actuating the operation key defining the reverse operation to reduce the set speed.

According to another feature of the invention, when the increase or decrease key is actuated, its function is self-held to resolve the trouble of continuously activating the operation key during the change of the frequency, and the operation key defining the reverse operation is used to cancel self-holding whereby the cancel key required normally can be eliminated. Also, activating the operation key for a predetermined period time sets the condition of self-holding, whereby when the frequency is to be fine-adjusted, activating the increase and decrease keys alternately for a short time allows the frequency to be set easily without self-holding.

According to a further feature of the invention, the key defining the same operation is kept actuated to change the set speed of the frequency so that the set speed is high when the set value of the frequency is changed greatly and the set speed is switched low when the set speed approaches the target frequency, whereby the time required to change the frequency setting is reduced and the target frequency can be set easily.

According to yet another feature of the invention, the increase and decrease keys are used to switch the frequency shown on the frequency display device between the set frequency and the output frequency, whereby the operation key (for monitor switching) can be eliminated without the reduction of the function.

According to an additional feature of the invention, the increase and decrease keys are used to give the direction of rotation and the operation commands, whereby the forward rotation, reverse rotation and stop keys can be eliminated.

According to a final feature of the invention, when the variation value of the set frequency is carried to a higher digit place, the set speed is lowered automatically so that the higher the digit place is, the gentler the ramp of the set speed is, whereby the target frequency is not exceeded and the setting can be made easily.

DESCRIPTION OF THE PREFERRED EMBODIMENTS

Embodiment 1

Figure 1:
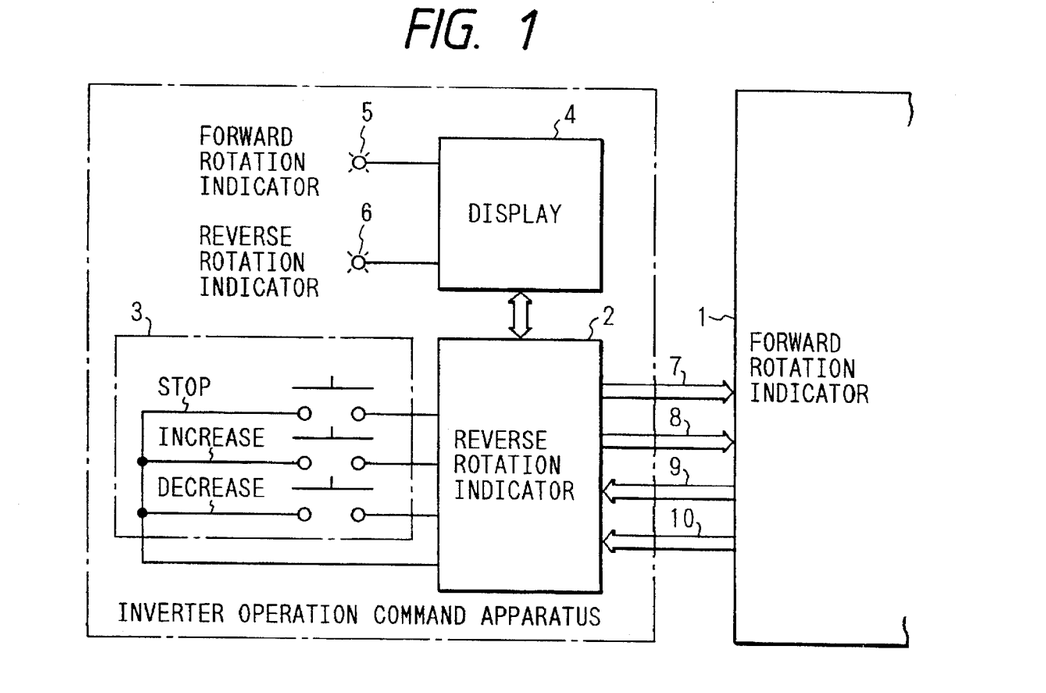
FIG. 1 is a schematic block diagram of an inverter operation command apparatus showing a first embodiment of the invention.
Figure 2:
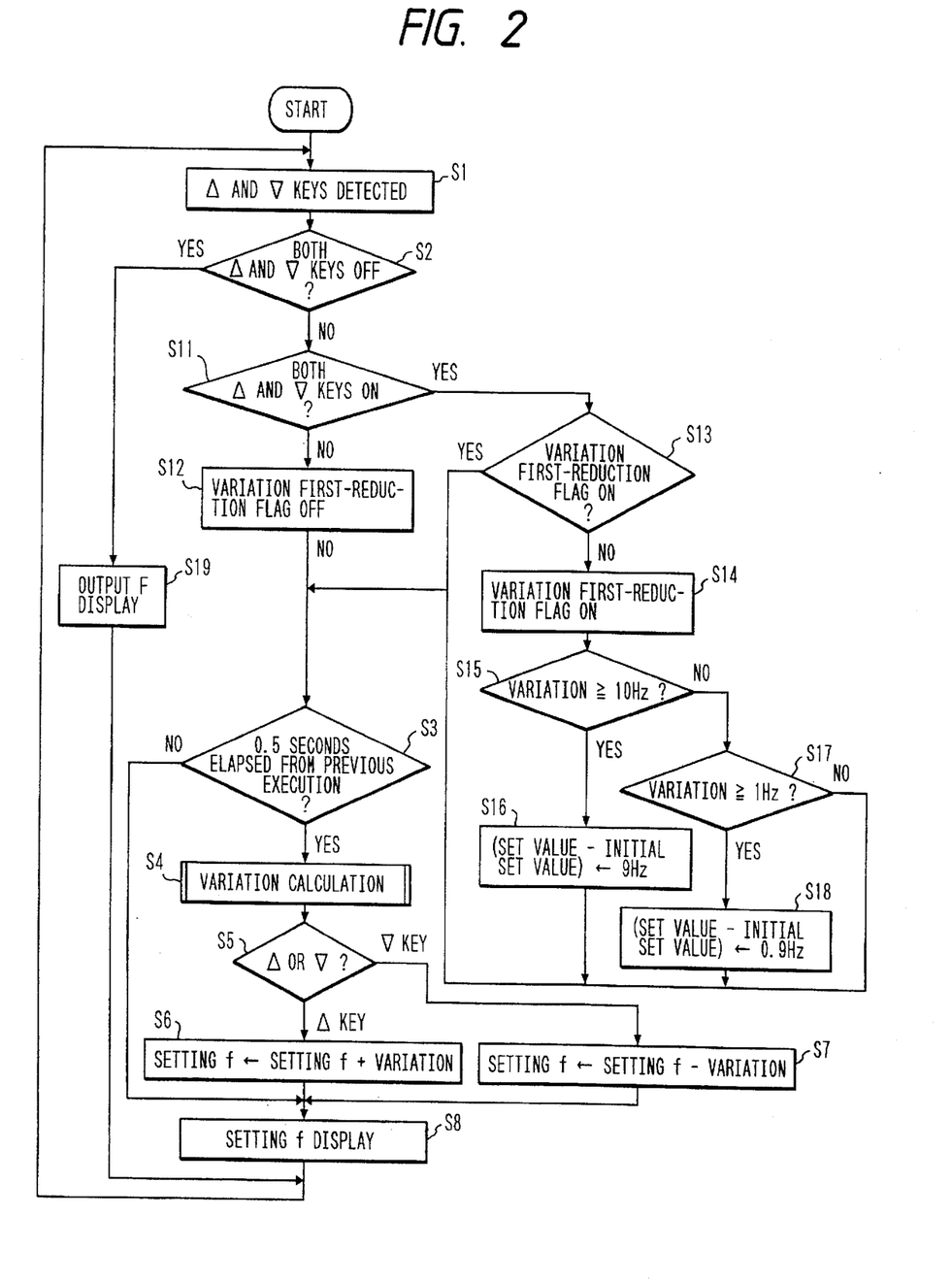
FIG. 2 is a flowchart showing processing at the time of pressing an operation key in the inverter operation command apparatus according to the first embodiment of the invention.

FIG. 1 is a schematic block diagram of an inverter operation command apparatus according to a first embodiment of the invention. In this figure, the numeral 2 indicates a controlling microprocessor, and 3 denotes operation keys consisting of the stop, increase, decrease and other keys. As compared to those in the conventional example in FIG. 10, some of the operation keys can be eliminated. FIG. 2 is a flowchart showing processing performed when the operation key 3 is actuated in the inverter operation command apparatus according to the embodiment of the first invention. The processing performed when the increase or decrease key is pressed will now be described.

When the actuation of the increase key (hereinafter referred to as the "$\Delta$ key") or the decrease key (hereinafter referred to as the "$\nabla$ key") is detected and either or both keys are being actuated (steps S1, S2), the operation proceeds to step S11.

At step S11, it is checked whether or not both the $\Delta$ and $\nabla$ keys are being actuated. If both are not being actuated, a variation value first-reduction flag is switched off (step S12) and the same processing as at steps S3 to S8 in the conventional example is then carried out. Namely, when the increase and decreases are not actuated at the same time, the operation performed is the same as in the conventional example.

When the $\Delta$ and $\nabla$ keys are actuated at the same time, it is determined by means of the variation value first-reduction flag whether the keys had also been actuated at the same time previously (step S13). If so, the processing shifts to step S3 without any operation.

If the keys had not been actuated at the same time previously, the variation value first-reduction flag is switched on (step S14) and it is determined whether or not the variation value is 10 Hz (step S15). If it is greater than or equal to 10 Hz, 9 Hz is written as the value of the difference between the current frequency set value and the initial set value before the $\Delta$ and $\nabla$ keys were pressed (step S16). If the variation value is less than 10 Hz, it is then determined whether or not the variation value is greater than or equal to 1 Hz (step S17). If it is greater than or equal to 1 Hz, 0.9 Hz is written as the value of the difference between the current frequency set value and the initial set value before the $\Delta$ and $\nabla$ keys were pressed (step S18). If the variation value is less than 1 Hz, the processing advances to step S3 without any operation.

Namely, by further activating the key defining the reverse operation when the frequency is being set by the increase or decrease key, the increments/decrements of 10 Hz change to those of 1 Hz and the increments/decrements of 1 Hz to those of 0.1 Hz.

Figure 3:
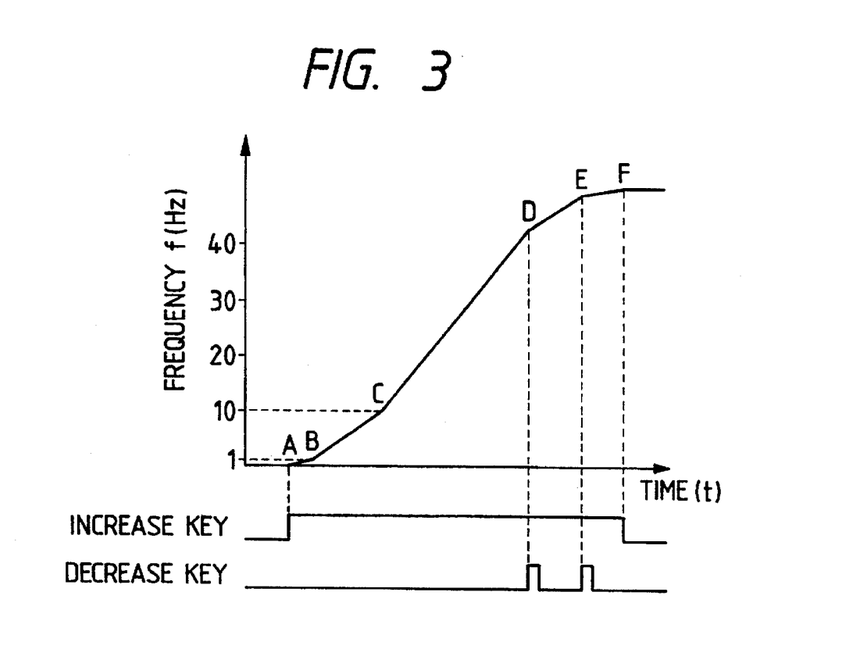
FIG. 3 is a diagram showing the change of a set frequency at the time of pressing the operation key according to the first embodiment of the invention.

FIG. 3 shows the change of the set frequency at the time of activating the operation key according to the first embodiment of the invention.

As shown in FIG. 3, the ramp of the frequency set speed is one digit gentler than that of the conventional set speed in FIG. 11. As shown, when the increase key is turned from an off to an on condition at point A, the frequency rises gently through range B until it reaches the 10 Hz level at point C, and continues to rise thereafter. At point D, while the increase key is actuated, if the decrease key is actuated briefly, the increase in frequency slows and, as the decrease key is again pressed, the increase further slows. When the increase key is released, the frequency increase is stopped at point F.

Embodiment 2

Figure 4:
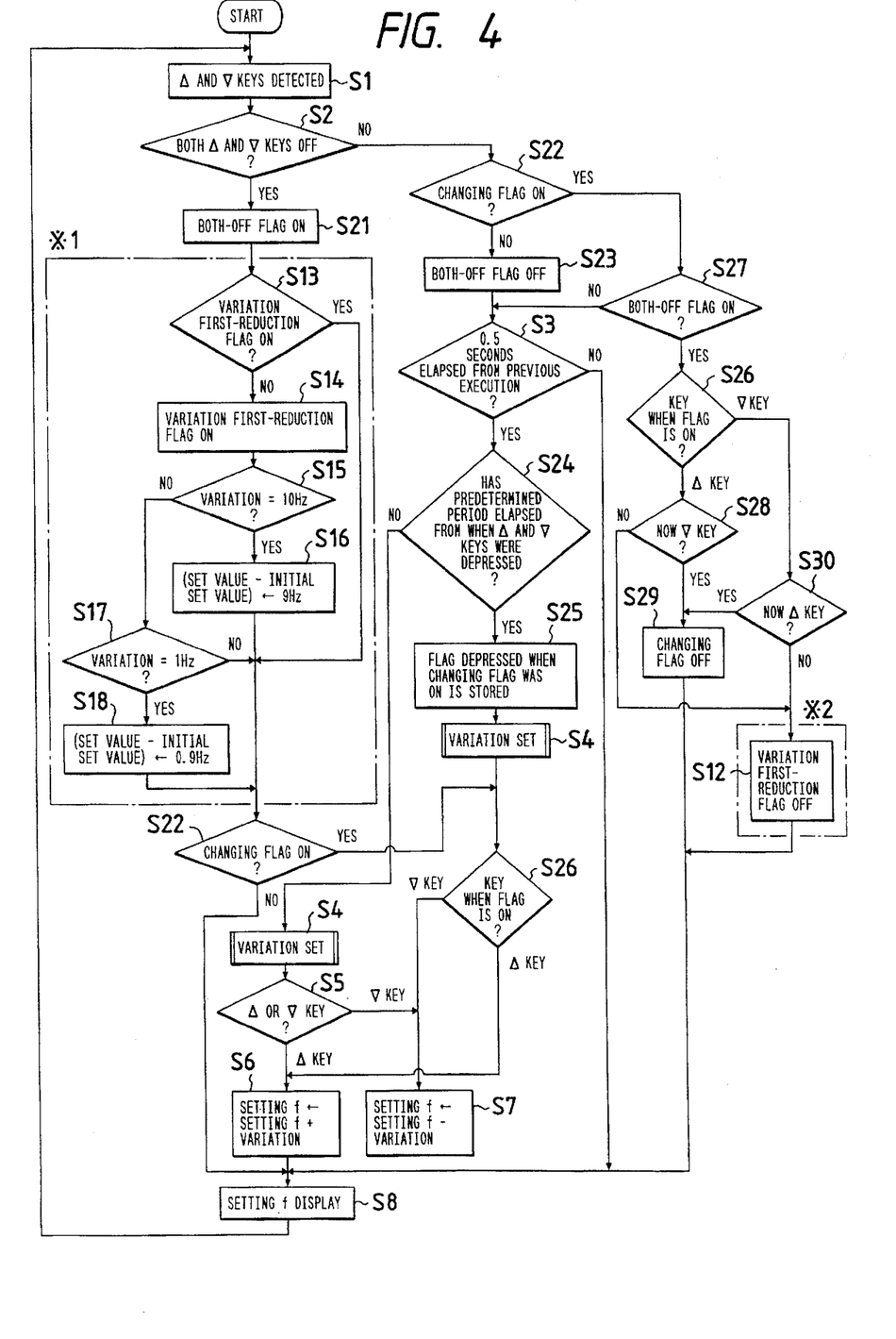
FIG. 4 is a flowchart showing processing at the time of pressing an operation key in an inverter operation command apparatus according to another embodiment of the invention.

FIG. 4 is a flowchart showing the processing performed when the operation key is actuated in the inverter operation command apparatus according to a second embodiment of the invention. When the actuation of the $\Delta/\nabla$ key is detected and both keys are off (steps S1, S2), a both-off flag is switched on (step S21) and the operation proceeds through an area *1 having steps S13–S18 to step S22A. A description of the area marked *1 is omitted here because it will be described subsequently.

At step S22A, a changing flag is checked. If it is off, the processing progresses to step S8. If the flag is on, the operation advances to step S26A which will be described later.

Then, if either of the △ and ▽ keys is being actuated at step S2, the changing flag is checked (step S22B). If the changing flag is off, the both-off flag is switched off (step S23).

If the time elapsed is less than 0.5 seconds at step S3, the operation moves to step S8. If 0.5 seconds have elapsed, it is checked whether or not the △/▽ key has been actuated for a predetermined period of time (step S24). If not, the same processing as at steps S4 to S8 in the conventional example is performed. If the key has been actuated for that period, the changing flag is switched on and the key pressed is stored (step S25). Further, the variation value is set (step S4) and the frequency set value is added to or subtracted from according to the key stored (from step S26A onward).

Subsequently, if the changing flag is on at step S22A, the both-off flag is checked. If it is off, the operation proceeds to step S3. If the both-off flag is on (step S27), the key stored previously is compared with the key actuated anew. If the keys are the same, the processing advances to step S8 without any operation. If the keys are different, as determined by steps S28 and S30, the changing flag is switched off (step S29) and the processing moves to step S8.

This processing will be described in terms of operation. When either of the △ and ▽ keys is actuated and 0.5 seconds or more have elapsed, the frequency set value is added to or subtracted from. Further, if that key has been actuated for the predetermined period of time, the addition or subtraction processing is self-held. Subsequently, if the key defining the reverse operation is actuated in the self-holding state, self-holding is canceled. Also, if that key has been actuated for 0.5 seconds or longer, the processing of the fundamental function of that key is executed.

Namely, when the increase or decrease key is kept actuated for the predetermined length of time, the corresponding operation is self-held and the frequency is added to or subtracted from, without the key being actuated. When the key defining the reverse operation is actuated in that state, the addition or subtraction processing is stopped, and if that key is further kept actuated, the function of the key is implemented. If the length of time when the increase or decrease key is kept actuated is less than the predetermined, the corresponding operation is not self-held. Hence, this function is useful when setting for alternating between an increase and a decrease is required.

Figure 5:
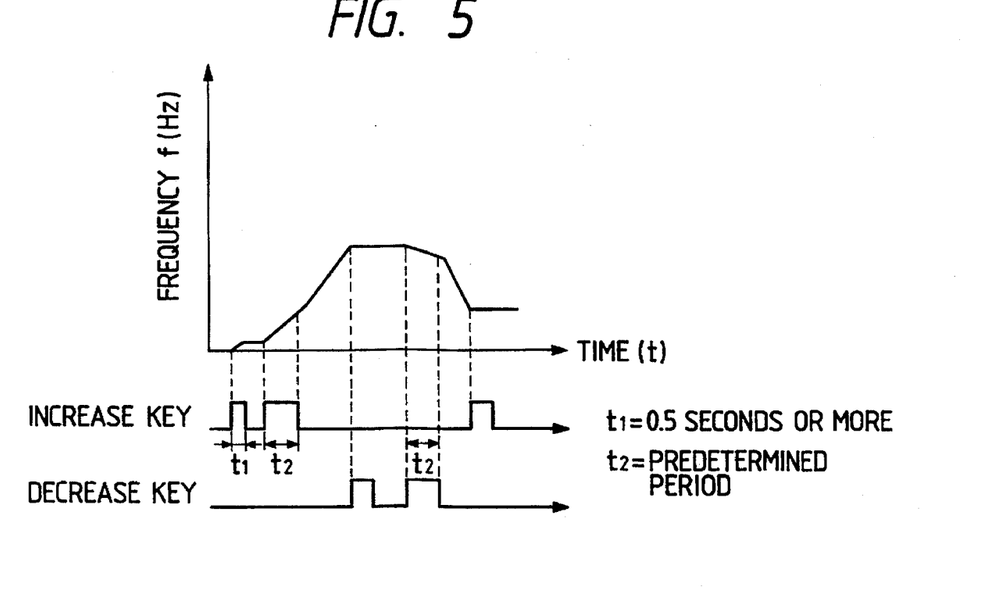
FIGS. 5 is a diagram showing the change of a set frequency at the time of pressing the operation key according to the previous embodiment of the invention.

FIG. 5 shows the change of the set frequency at the time of actuation of the operation key according to the embodiment of the second invention. When the increase key is actuated for a period $t_1$, then is released and followed by an actuation for a period $t_2$, the rise will continue until a decrease key is actuated.

Embodiment 3

A third embodiment will now be described with reference to a flowchart shown in the area marked *1 in FIG. 4. The area of the flowchart other than *1 in FIG. 4 has already been described and therefore will not be described.

When the increased or decrease key is kept actuated for the predetermined period of time, the corresponding operation is self-held. Further, if the key defining the same operation is again actuated during that operation, the processing advances to step S12, where the variation value first-reduction flag is switched off.

The increments/decrements of 10 Hz then change to those of 1 Hz and the increments/decrements of 1 Hz to those of 0.1 Hz. (Steps S13 to S18)

Figure 6:
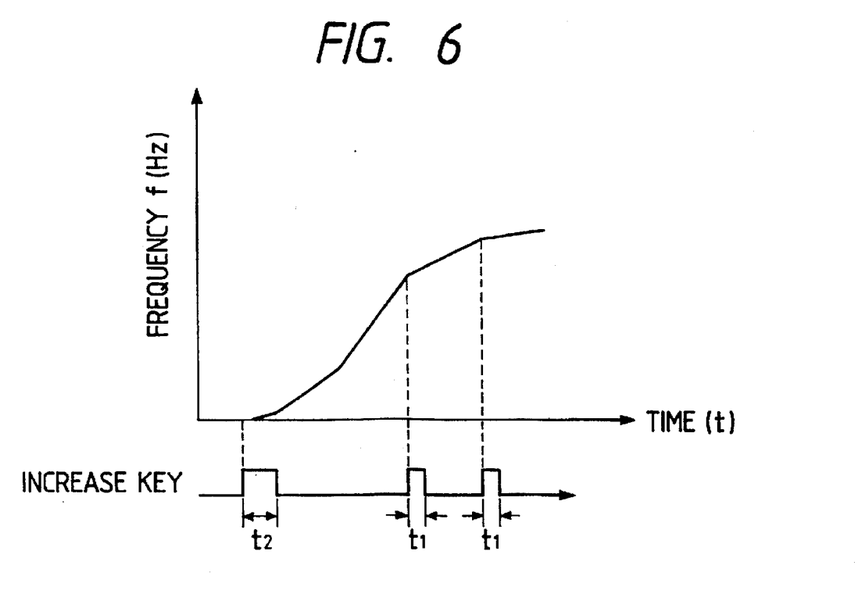
FIG. 6 is a diagram showing the change of a set frequency at the time of pressing the operation key according to a further embodiment of the invention.

FIG. 6 shows the change of the set frequency at the time of actuation of the operation key according to the third embodiment of the invention. Specifically, activating an increase key during a period $t_2$ will cause the frequency to rise, and pressing the same key a second and third time period $t_1$, will reduce the rate of increase.

As shown in the figure, when the increase or decrease key is kept actuated for the predetermined period of time to self-hold the corresponding operation and the key defining the same operation as the operation is actuated again during the execution of the operation, the ramp of the frequency set speed is one digit gentler than that of the previous set speed.

Embodiment 4

A fourth embodiment will now be described in accordance with FIG. 2. The △/▽ key actuation is detected (steps S1, S2). While the key is not being actuated, the output frequency is displayed (step S19). While the key is being actuated, the addition/subtraction processing of the set frequency is performed and that set frequency is also displayed (step S8).

Namely, the frequency display device 4 normally shows the output frequency of the inverter and shows the set frequency when the frequency is being set.

Embodiment 5

Figure 7:
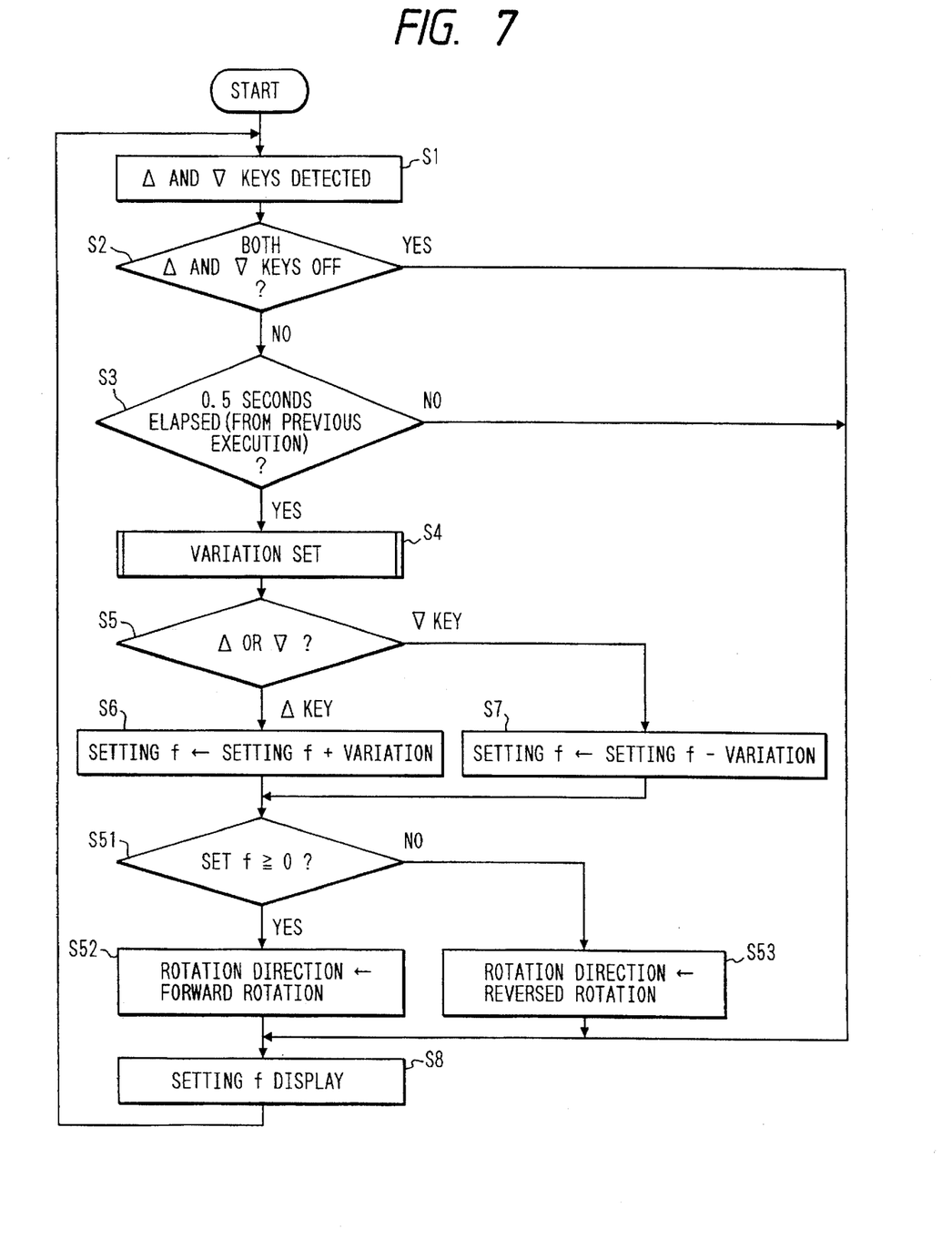
FIG. 7 is a flowchart showing processing at the time of pressing an operation key in an inverter operation command apparatus according to a further embodiment of the invention.

FIG. 7 is a flowchart showing the processing performed when the operation key is actuated in the inverter operation command apparatus according to a fifth embodiment of the invention.

When the operation key is actuated, the addition or subtraction of the frequency is preformed as previously described in FIG. 2 (steps S1 to S7). Then, if the polarity of the set frequency is positive according to the result of calculation, the direction of rotation is set to forward rotation. If the polarity is negative, the direction of rotation is set to reverse rotation (steps S51 to S53).

Figure 8:
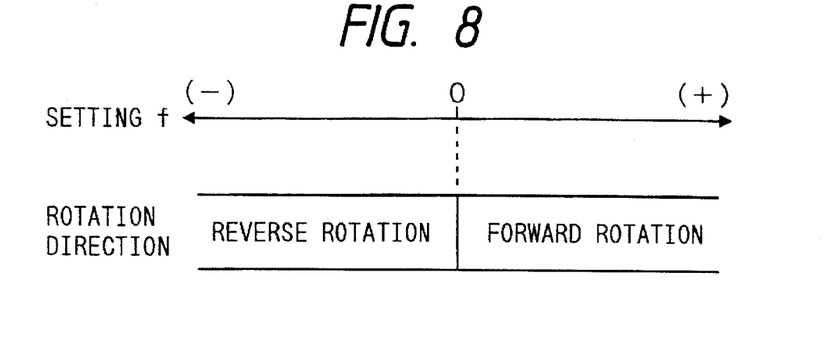
FIG. 8 is a diagram showing the operation of the previous embodiment of the invention.

FIG. 8 shows operation in the fifth embodiment of the invention, i.e., if the frequency set by the increase/decrease key is positive, the inverter rotates in the forward rotation direction at the set frequency. If the frequency is negative, the inverter rotates in the reverse rotation direction at the absolute value of the set frequency.

Embodiment 6

Figure 9:
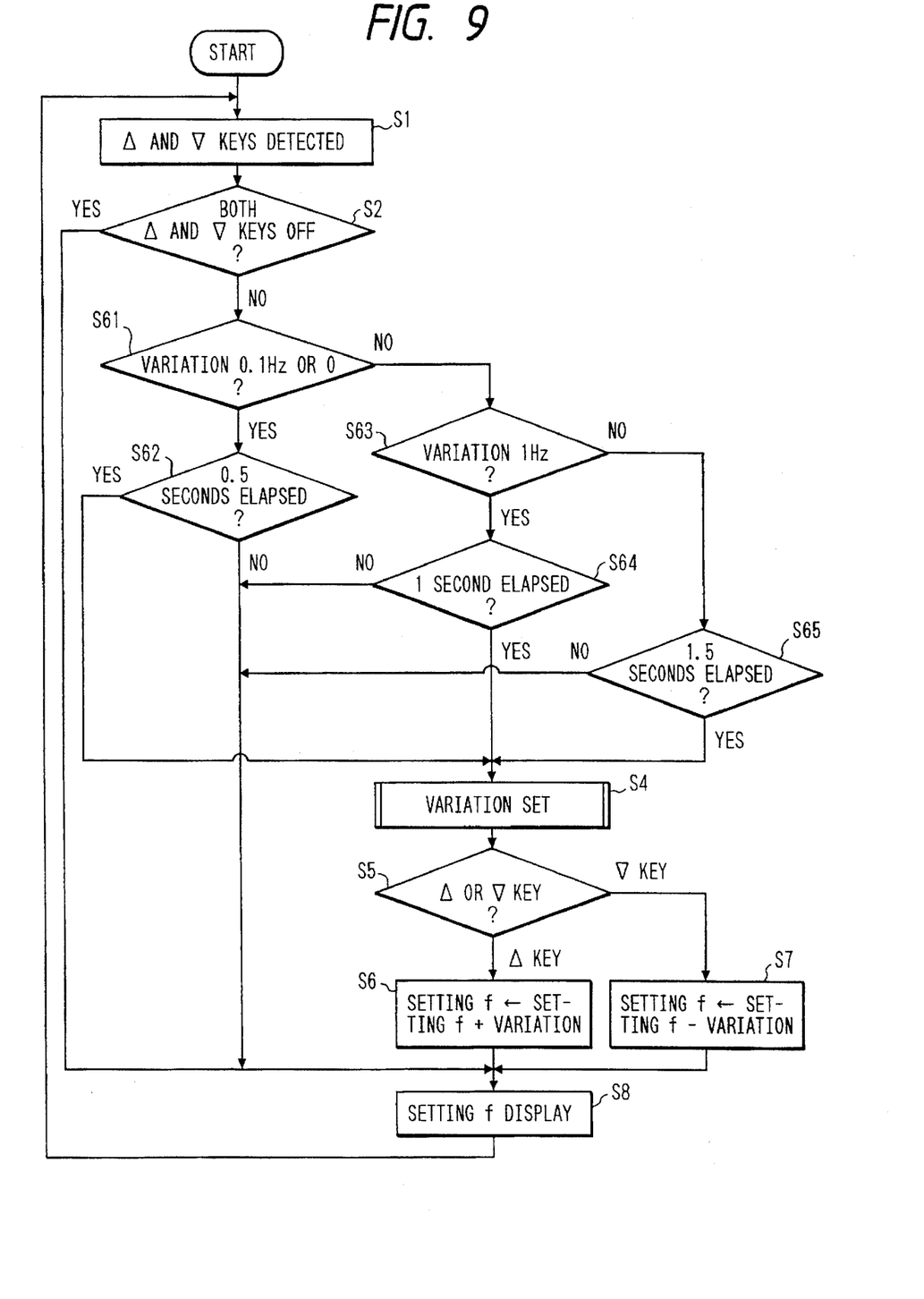
FIG. 9 is a flowchart showing processing at the time of pressing an operation key in an inverter operation command apparatus according to yet another embodiment of the invention.

FIG. 9 is a flowchart shoving the processing performed when the operation key is actuated in the inverter operation command apparatus according to a sixth embodiment of the invention.

The operation key actuated is detected (steps S1, S2). If the operation key is being actuated, it is then checked whether the variation value is 0, 0.1 Hz, 1 Hz or 10 Hz (steps S61, S63). If the variation value is 0.1 Hz, it is then checked whether 0.5 seconds have elapsed (step S62). If 0.5 seconds have elapsed, the processing shifts to step S4. Similarly, if the variation value is 1 Hz, it is then checked whether 1 second has elapsed (step S64). If 1 second has elapsed, the processing proceeds to step S4. Further if the variation value is 10 Hz, it is then checked whether 1.5 seconds have elapsed (step S65). If 1.5 seconds have elapsed, the processing moves to step S4. In the above processing, the time of performing addition/subtraction is changed according to the variation value of the set frequency.

In this drawing, addition/subtraction is performed at intervals of 0.5 seconds for the variation value in 0.1 Hz increments/decrements, at intervals of 1 second for the variation value in 1 Hz increments/decrements, and at intervals of 1.5 seconds for the variation value in 10 Hz increments/decrements. Thus, the higher the digit place is, the gentler the ramp of the set speed is.

The entire disclosure of each and every foreign patent application from which the benefit of foreign priority has been claimed in the present application is incorporated herein by reference, as if fully set forth.

Although this invention has been described in at least one preferred embodiment with a certain degree of particularity, it is to be understood that the present disclosure of the preferred embodiment has been made only by way of example and that numerous changes in the details and arrangement of components may be made without departing from the spirit and scope of the invention as hereinafter claimed.

What is claimed is:

1. An inverter operation command apparatus comprising:

operation keys, including an increase key and a decrease key, which designate operation signals which are provided to an inverter unit, said operation signals including frequency increase and decrease setting commands which, as designated by said increase key and decrease key, respectively, control an increase and decrease, respectively, of an output frequency of said inverter unit;

a frequency display device which alternately displays, as a numerical value, a set frequency designated by said operation keys and said output frequency; and a controller which processes said signals set by said operation keys, outputs said signals to said inverter unit, and switches said frequency display device between displaying said output frequency and said set frequency, said controller further operating to reduce a rate of change at which said output frequency is increased when said decrease key is actuated while said increase key is being activated to control increasing of said output frequency, and operating to reduce a rate of change at which said output frequency is decreased when said increase key is actuated while said decrease key is being activated to control decreasing of said output frequency.

2. An inverter operation command apparatus as defined in claim 1, wherein said controller controls said display device to display said set frequency only while the increase key or decrease key is being actuated.

3. An inverter operation command apparatus as claimed in claim 1, wherein said operation signals include an operation command signal which instructs said inverter unit to control a motor, and a direction of rotation command signal which instructs said inverter unit to control a direction of rotation of said motor.

4. An inverter operation command apparatus comprising:

operation keys, including an increase key and a decrease key, which designate operation signals which are provided to an inverter unit, said operation signals including frequency increase and decrease setting commands which, as designated by said increase key and decrease key, respectively, control an increase and decrease, respectively, of an output frequency of said inverter unit;

a frequency display device which alternately displays, as a numerical value, a set frequency designated by said operation keys and said output frequency; and a controller which processes said signals set by said operation keys, outputs said signals to said inverter unit, and switches said frequency display device between displaying said output frequency and said set frequency, said controller further operating, when said increase or decrease key is actuated for a predetermined period of time, to continue increasing or decreasing, respectively, said output frequency for a period of time greater than said predetermined period of time, operating to stop the increasing of said output frequency When said decrease key is actuated while said output frequency is being increased, and operating to stop the decreasing of said output frequency when said increase key is actuated while said output frequency is being decreased.

5. An inverter operation command apparatus as defined in claim 4, wherein said controller controls said display device to display said set frequency only while the increase key or decrease key is being actuated.

6. An inverter operation command apparatus as claimed in claim 4, wherein said operation signals include an operation command signal which instructs said inverter unit to control a motor, and a direction of rotation command signal which instructs said inverter unit to control a direction of rotation of said motor.

7. An inverter operation command apparatus comprising:

operation keys, including an increase key and a decrease key, which designate operation signals which are provided to an inverter unit, said operation signals including frequency increase and decrease setting commands which, as designated by said increase key and decrease key, respectively, control an increase and decrease, respectively, of an output frequency of said inverter unit;

a frequency display device which alternately displays, as a numerical value, a set frequency designated by said operation keys and said output frequency; and a controller which processes said signals set by said operation keys, outputs said signals to said inverter unit, and switches said frequency display device between displaying said output frequency and said set frequency, said controller further operating to increase said output frequency when said increase key is depressed and to change a rate of change at which said output frequency is increased when said increase key is again actuated after being activated to control increasing of said output frequency and while said increasing is occurring, and operating to decrease said output frequency when said decrease key is depressed and to change a rate of change at which said output frequency is decreased when said decrease key is actuated after being activated to control decreasing of said output frequency and while said decreasing is occurring.

8. An inverter operation command apparatus as defined in claim 7, wherein said controller controls said display device to display said set frequency only while the increase key or decrease key is being actuated.

9. An inverter operation command apparatus as claimed in claim 7, wherein said operation signals include an operation command signal which instructs said inverter unit to control a motor, and a direction of rotation command signal which instructs said inverter unit to control a direction of rotation of said motor.

10. An inverter operation command apparatus comprising:

operation keys, including an increase key and a decrease key, which designate operation signals which are provided to an inverter unit, said operation signals including a direction of rotation command which indicates a direction of rotation which said inverter unit controls a motor to rotate, and frequency increase and decrease setting commands which, as designated by said increase key and decrease key, respectively, control an increase and decrease, respectively, of an output frequency of said inverter unit;

a frequency display device which alternately displays, as a numerical value, a set frequency designated by said operation keys and said output frequency; and a controller which processes said signals designated by said operation keys, outputs said signals to said inverter unit, and switches said frequency display device between displaying said output frequency and said set frequency, said controller further operating to output said direction of rotation command based on a polarity of the set frequency as set by operation of said increase key or said decrease key, such that when operation of said increase key or said decrease key results in said polarity of said set frequency being a first polarity, said direction of rotation command indicates that said motor is to rotate in a first direction of rotation, and when said operation of said increase key or said decrease key results in said polarity of said set frequency being a second polarity, opposite to said first polarity, said direction of rotation command indicates that said motor is to rotate in a second direction of rotation opposite to said first direction of rotation.

11. An inverter operation command apparatus as claimed in claim 10, wherein said operation signals include an operation command signal which instructs said inverter unit to control a motor.

12. An inverter operation command apparatus comprising:

operation keys, including an increase key and a decrease key, which designate operation signals which are provided to an inverter unit, said operation signals including frequency increase and decrease setting commands which, as designated by said increase key and decrease key, respectively, control an increase and decrease, respectively, of an output frequency of said inverter unit;

a frequency display device which alternately displays, as a numerical value, a set frequency designated by said operation keys and said output frequency; and a controller which processes said signals set by said operation keys, outputs said signals to said inverter unit, and switches said frequency display device between displaying said output frequency and said set frequency, said controller further operating to determine an amount that said output frequency has increased or decreased from an initial setting, and to change a rate and a size of increment or decrement at which said output frequency is increased or decreased, respectively, when said amount is greater than a predetermined amount.

13. An inverter operation command apparatus as claimed in claim 12, wherein said operation signals include an operation command signal which instructs said inverter unit to control a motor, and a direction of rotation command signal which instructs said inverter unit to control a direction of rotation of said motor.

* * * * *